(12) United States Patent
Hoff

(10) Patent No.: US 8,357,231 B2
(45) Date of Patent: Jan. 22, 2013

(54) DEVICE AND METHOD FOR RECOVERING MOISTURE IN THE ATMOSPHERE

(75) Inventor: Petrus Mattheus Maria Hoff, Roosendaal (NL)

(73) Assignee: P.M.M. Hoff Holding B.V., Steenbergen (NL)

( * ) Notice: Subject to any disclaimer, the term of this patent is extended or adjusted under 35 U.S.C. 154(b) by 0 days.

(21) Appl. No.: 13/399,219

(22) Filed: Feb. 17, 2012

(65) Prior Publication Data
US 2012/0160351 A1 Jun. 28, 2012

Related U.S. Application Data

(63) Continuation of application No. 12/808,407, filed as application No. PCT/NL2008/050816 on Dec. 18, 2008, now Pat. No. 8,118,917.

(30) Foreign Application Priority Data

Dec. 18, 2007 (NL) .................................. 2001099
Jan. 15, 2008 (NL) .................................. 2001185

(51) Int. Cl.
*B01D 45/00* (2006.01)
(52) U.S. Cl. ............... 95/267; 55/434; 55/442; 55/443; 55/444; 55/445; 55/446; 55/428; 55/429; 55/423
(58) Field of Classification Search .................... 55/434, 55/442–446, 428, 429, 423
See application file for complete search history.

(56) References Cited

U.S. PATENT DOCUMENTS

| | | | |
|---|---|---|---|
| 1,231,976 A | 7/1917 | Weitze |
| 1,773,020 A | 8/1930 | Willis |
| 2,431,890 A | 12/1947 | Raines |
| 3,534,498 A | 10/1970 | Herril |
| 3,618,260 A | 11/1971 | Convey |
| 3,755,965 A | 9/1973 | Emery |
| 3,856,205 A | 12/1974 | Rohling |
| 3,915,419 A | 10/1975 | Brown |
| 4,087,938 A | 5/1978 | Koch |

(Continued)

FOREIGN PATENT DOCUMENTS

CN 2471707 Y 1/2002
(Continued)

OTHER PUBLICATIONS

International Search Report from PCT/NL2008/050816, dated Mar. 17, 2009.
(Continued)

*Primary Examiner* — Jason M Greene
*Assistant Examiner* — Dung H Bui
(74) *Attorney, Agent, or Firm* — Swanson & Bratschun, L.L.C.

(57) ABSTRACT

The invention relates to a device for recovering moisture present in the atmosphere. The device comprises a collection structure with a water recovery surface which during use at least partly makes an angle with respect to the orientation of gravity. Further, the collection structure is detachably couplable to a reservoir for storing the recovered moisture. In addition, the collection structure is nestable.

12 Claims, 9 Drawing Sheets

U.S. PATENT DOCUMENTS

| | | |
|---|---|---|
| 4,135,599 A | 1/1979 | Fair |
| 4,745,707 A | 5/1988 | Newby |
| 4,885,870 A | 12/1989 | Fong |
| 4,952,229 A | 8/1990 | Muir |
| 5,279,070 A | 1/1994 | Shreckhise |
| 5,299,384 A | 4/1994 | Andrews |
| 5,315,783 A | 5/1994 | Peng |
| 5,549,277 A | 8/1996 | Franz |
| 5,992,088 A | 11/1999 | Henningsson |
| 6,418,663 B1 | 7/2002 | Smith |
| 6,976,334 B1 | 12/2005 | Bowditch |
| 7,171,783 B1 | 2/2007 | Fidotti |
| 2007/0022660 A1 | 2/2007 | Buitendag |
| 2007/0062114 A1 | 3/2007 | Kruer |
| 2008/0190017 A1 * | 8/2008 | Hoff ............................. 47/21.1 |

FOREIGN PATENT DOCUMENTS

| | | |
|---|---|---|
| GB | 1 603 661 | 11/1981 |
| GB | 2 230 929 | 11/1990 |
| GB | 723239 | 2/1995 |
| OA | 11 356 | 12/2003 |
| WO | WO 00/00015 | 1/2000 |
| WO | WO 2004/029372 | 4/2004 |
| WO | WO 2006/132526 | 12/2006 |
| WO | WO 2006132526 A2 * | 12/2006 |

OTHER PUBLICATIONS

Nelson (2003) http://www.rexresearch.com/airwells/airwells.htm, "Air Wells, Fog Fences and Dew Ponds Methods for Recovery of Atmospheric Humidity".

* cited by examiner

DEVICE AND METHOD FOR RECOVERING MOISTURE IN THE ATMOSPHERE

RELATED APPLICATIONS

This application is a continuation of U.S. patent application Ser. No. 12/808,407, filed on Feb. 21, 2012, which is a 35 U.S.C. §371 national phase application of PCT/NL2008/050816 (WO 2009/078721), filed on Dec. 18, 2008, each entitled "Device and Method for Recovering Moisture in the Atmosphere", which application claims priority to Netherlands Application Nos. 2001185, filed Jan. 15, 2008 and 2001099, filed Dec. 18, 2007, which are incorporated herein by reference in their entirety.

BACKGROUND

The invention relates to a device for recovering moisture present in the atmosphere, comprising a collection structure for collecting moisture present in the atmosphere, the collection structure being provided with a water recovery surface which, during use, at least partly makes an angle with respect to the orientation of gravity.

Such a device is for instance known from International patent publication WO 2006/132526 for protecting young plants during afforestation.

After planting young plants, often losses occur due to lack of moisture. This is because the young plant has no or hardly any root structures which are able to absorb water from the subsoil, whereas the plant loses moisture through evaporation. In addition, by digging a planting hole, the capillary action of the soil is broken, so that no upward water transport from the subsoil takes place anymore. Of course, the losses after planting the young plants entail extra work, such as removing dead plant material and placing new plants.

The device as described in WO '526 is voluminous and hence expensive in transport, storage and distribution.

SUMMARY

The invention contemplates obtaining a device according to the opening paragraph hereof which, while maintaining the advantages, obviates the disadvantages mentioned. In particular, the invention contemplates obtaining a device that takes up less volume during transport, storage and/or distribution. To that end, the collection structure is detachably couplable to a reservoir for storing the recovered moisture, and the collection structure is nestable.

By making the collection structure and the reservoir of detachably couplable design and giving the collection structure a nestable form, a considerable saving of space can be realized, while assembly and/or disassembly remains relatively simple. As a result, the costs of transport, storage and/or distribution also decrease. Thus, the collection structure and the reservoir form modules of the device, which enables modular build-up, storage and distribution. Moreover, a separate module, for instance the collection structure, can then be easily replaced with an adapted specimen afterwards.

By the use of the collection structure, moisture present in the atmosphere, such as rain, hail and/or snow, but also water vapor, can be recovered relatively simply. The recovered moisture can subsequently be used to meet the moisture deficiency of the plant.

The collection structure collects moisture present in the atmosphere in liquid form whereupon the moisture, under the influence of gravity, flows to lower parts of the water recovery surface. Frozen moisture, such as hail and/or snow, also finds its way to the lower parts of the collection structure in such a manner.

Furthermore, according to the invention the collection structure is also arranged for recovering moisture present in the atmosphere in gaseous phase, viz. water vapor. Under suitable ambient conditions, such as a temperature of the water recovery surface below the dew point and a sufficiently high humidity of the air, water vapor condenses on the water recovery surface. The water vapor precipitates on the receiving surface in the form of moisture drops. Under the influence of gravity, the moisture drops slide down. As the moisture drops slide down, their size increases since the condensed drops unite through cohesion. Since in this way relatively much moisture can be recovered from the atmosphere, also relatively much moisture can be supplied to the young plant to meet the deficiency of moisture, so that young plant loss will decrease. In recovering moisture present in the atmosphere, only passive structures are used which operatively do not consume any external energy and do not comprise any moving parts.

It is noted that a young plant is understood to mean a young plant in an early stage, such as a cultivated plant, young tree or shrub, but also newly germinated plant material, a seed or a spore.

Preferably, the top side of the water recovery surface is further provided with an adhesion-reducing additive and/or cover layer, for instance of PET and/or Teflon, and/or through the use of small unevennesses and/or roughening, possibly with an addition of, though not limited to, a wax film, a silicone or Teflon product or other adhesion-reducing substance, so that a water-repellent effect is obtained in that the mutual cohesion of water increases and/or the adhesion of water to the surface of the instrument decreases, so that larger drops are formed. As a result of this, that is, of their weight increase, the drops, due to the increased weight and hence increased sensitivity to gravity and due to the proportionally lower adhesion as a result of the larger drops formed, can more easily reach the lower parts of the water recovery surface, so that the amount of recovered moisture increases.

Advantageously, the coverage angle of the water recovery surface during operation faces away from the earth as much as possible, so that infrared radiation to space is stimulated as much as possible. As a result, the temperature of the water recovery surface will fall. By further providing the water recovery surface on the bottom side with thermal insulation, for instance by the use of insulation material and/or by creating an air buffer in an insulating chamber, the infrared radiation of heat from the water recovery surface is compensated less rapidly by heat from parts located under the water recovery surface. In this way, heat supply to the water recovery surface is limited. Put differently, the heat uptake of the water recovery surface is relatively slow. As a result, a temperature difference between the water recovery surface and the ambient air can be established relatively fast and be maintained relatively long, for instance in a clear and/or cool night. By the use of insulation, for instance by preventing hot air coming into contact with the water recovery surface, the water recovery surface maintains a relatively low temperature for a long time, also when the temperature of the ambient air increases, so that the condensation process, whereby passing warm air cools down and condensation occurs, is maintained relatively long and hence the water recovery process is also maintained. Thus, the temperature of the surface follows the course of the temperature upon cooling of the ambient air in an accelerated manner and the course of the temperature upon warming thereof in a delayed manner. As soon as warm air comes into contact with the cold water recovery surface, the warm air is cooled down, so that the dew point is reached and condensation occurs. The resulting dew precipitates on the water recovery surface. In order to maintain temperature differences between the air and the surface as along as possible, the water recovery surface may also be provided with, or wholly consist of, material having a high specific heat.

As the water recovery surface of the collection structure is oriented substantially upwards, the structure loses heat by radiation. As a result, the temperature of the water recovery surface decreases, so that moisture present in the atmosphere condenses on the structure which then has a lower temperature than the ambient air. This natural process, sometimes referred to as giving out, is utilized by the device according to the invention. The choice of materials and geometry is then aimed at cooling down the water recovery surface and keeping it cool to prevent warming of the surface mentioned.

Further, the invention relates to a method for transporting, storing and/or distributing devices for recovering moisture present in the atmosphere.

Further advantageous embodiments of the invention are represented in the subclaims.

BRIEF DESCRIPTION OF THE DRAWINGS

The invention will be explained in more detail with reference to exemplary embodiments which are represented in the drawings. In the drawings.

Figure 1:
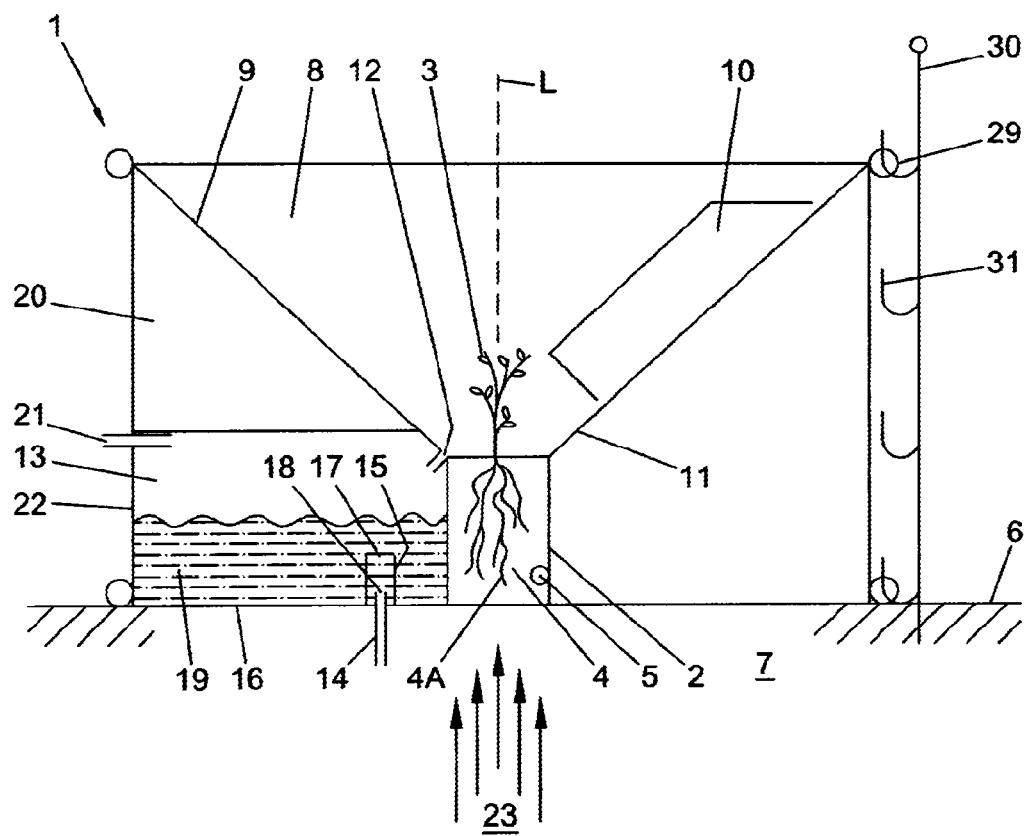
FIG. 1 shows a schematic view of a cross section of a first embodiment of a device according to the invention.

The drawing figures are only schematic representations of the invention and are exclusively given by way of non-limiting exemplary embodiments.

DETAILED DESCRIPTION

FIG. 1 shows a schematic side elevational view of a first embodiment of a device 1 for recovering moisture present in the atmosphere according to the invention. The device 1 comprises a tube 2 which surrounds a young plant 3 sideways, such that the young plant 3 is at least partly enclosed sideways. The tube 2 is open at the top and bottom, so that the plant can root downwards and can grow upwards. The young plant 3 is rooted in a soil block 4 which is so positioned in the tube 2 that the root structure 4a of the plant 3 is surrounded by the tube 2, while the lower end of the stalk is at the level of the lower edge of a water recovery surface, described hereinafter. Thus, the plant 3 is in the light and sufficient air flowing past is available. The soil block 4 comprises a substance, for instance soil or substrate, and is provided in the opening of the tube wall 2 in a clamped manner. The substance is optionally provided with symbiotic bacteria, eggs of animals, seeds, fungi, spores, and/or organic and/or inorganic materials for nutrition of the plant 3, the so-called graft. If the device 1 is manufactured from degradable organic material, a graft may also be provided in this material. For an improved stability, the soil block 4 may optionally be placed further down the tube 2.

The device 1 further comprises at least one graft shell 5 for supplying nutrients to the young plant 3. The graft shell 5 is preferably contained in the soil block 4 enclosed by the tube 2 and comprises at least one package which is degraded under the influence of erosion and/or bacterial action for a prolonged period, for instance months or years. In the package(s), material is present which stimulates the growth of the plant 3 and/or improves the condition of the plant 3, such as for instance nutrients and/or symbiotic bacteria. By using packages with different degradation periods, the substances present therein become available to the plant 3 in a dosed manner, so that, over a relatively long term, graft substances can be autonomously supplied to the plant 3. Thus the grafting shell may be provided with different degradation layers. However, it will be clear to the skilled person that instead of a graft shell 5 other means may also be used to nourish the plant, such as the above-described materials in the soil block 4.

The tube 2 is placed on the surface 6 of a subsoil 7. Preferably, the subsoil 7 has not been previously worked or has only been slightly scraped, so that the capillary 23 of the subsoil 7 has not been broken. This prevents the occurrence of unnecessary evaporation of moisture present in the subsoil 7. In addition, this stimulates a constant supply of moisture being maintained from the subsoil upwards by means of the non-broken capillary. Also, less erosion occurs. In addition, the above-described method saves labor-intensive treatments, such as for instance digging a hole in the subsoil. After the plant tube 2 has been placed, the young plant 3 roots in the subsoil 7 and directly comes into contact with the capillary moisture 23, so that the plant is directly supplied with a daily, constant amount of moisture both from the subsoil 7 and from the plant tube. Incidentally, it is possible to work the subsoil 7 beforehand, so that the root structure of the plant can be introduced into the subsoil 7. This can increase the chances of the plant 3 successfully striking root if sufficient moisture is present, and a still lower loss can be expected.

The device 1 further comprises a substantially funnel-shaped collection structure 8 with a water recovery surface 9 comprising receiving and collecting surfaces 10, 11 which will be discussed in more detail with reference to FIGS. 2 and 3. The collection structure is arranged for receiving moisture present in the atmosphere. To that end, the collection structure is provided with the water recovery surface 9 which is borne by the collection structure. The water recovery surface 9 is for instance formed from polypropylene or other plastic, and is provided with an adhesion-reducing cover layer and/or manufactured from water-repellent material or otherwise processed chemically and/or mechanically, so that the surface is water-repellent to prevent adhesion of water drops to the surface 9 and to promote mutual cohesion between the water drops. Thus, the water recovery surface may be configured to be at least partly water-repellent, for instance by applying a roughening process. By applying a roughening on a nanometer scale, the contact surface with water drops lying thereon is relatively small, so that adhesive forces are likewise relatively small. As a result, water drops can move relatively easily under the influence of the gravity field. The roughening process can for instance comprise a laser and/or etching process. In addition, the water recovery surface may be provided with a silicone top layer, so that a still higher water-repelling action is obtained. By the use of waxlike substances, water drops can then slide downwards, also when the surface is oriented almost transversely to gravity, and be collected in a reservoir described hereinafter.

Collecting surfaces 11 open all the way, only in part or not at all into the tube 2, so that recovered moisture from the atmosphere, such as rainwater and water of condensation, can possibly directly benefit the young plant 3. Further, in the water recovery surface 9, openings 12 are provided which serve as inlet points for allowing moisture on the water recovery surface 9 to pass to a reservoir 13 located under the collection structure, so that the recovered moisture can be stored. By arranging the reservoir substantially under the water recovery surface, the recovered water can remain relatively cool, so that undesired evaporation is prevented. Moreover, in this way a relatively stable construction is obtained which falls over less easily in the event of, for instance, whirlwinds. The young plant is thus better protected from external influences.

The reservoir 13 rests on the surface 6 of the subsoil 7, so that a stable position of the device 1 is obtained. Further, due to the covering of the environment of the young plant by the device, the growth of plant material in the immediate proximity of the young plant 3 is prevented, so that as much light as possible and as many available nutrients in the subsoil 7 as possible benefit the young plant 3. Also, the presence of the reservoir 13 limits evaporation of moisture from the subsoil around the plant 3. In the reservoir 13 shown, an amount of moisture 19 is already present. The reservoir 13 is provided with irrigation means designed as one or a plurality of irrigation points for delivering moisture present in the reservoir 13 to the subjacent subsoil 7.

The irrigation point shown is designed as a hollow needle 14 which serves as a dripper. With the aid of the hollow needle 14, the moisture present in the reservoir 13 can be introduced into the subsoil 7 in a dosed manner, so that sustained fresh water supply is realized. Also, the reservoir 13 with the irrigation point makes it possible for relatively large amounts of rainwater, while collected in a relatively short time, to be delivered to the subsoil 7 over a relatively long time. The hollow needle 14 further serves as anchorage for further enhancing the stability of the device 1. Of course, it is possible to implement the irrigation point differently, for instance as an opening in the bottom 16 of the reservoir 13, or as one or a plurality of capillary strings. A capillary string can for instance comprise cotton and/or fibers. Optionally, the dosage of the flow of moisture to be delivered to the subsoil 7 is settable with the aid of regulating means. The regulating means comprise, for instance, a permeable film or a membrane arranged in the passage of the hollow needle 14. When a capillary string is used, for instance a squeeze instrument, such as a swivel, may be used. Also, the regulating means may comprise movable covering means. Further, the capillary may reach through an opening in the wall of the reservoir, with the distance of the projecting part being varied to set a flow rate. Also, the regulating means may comprise one or a plurality of conically shaped elements which can partly or wholly close off corresponding openings in the bottom of the reservoir. Thus a flow of moisture to be delivered can be set.

The reservoir 13 comprises an outflow channel 15, also called overflow pipe, of which a first end 17 is operatively located above the bottom 16 of the reservoir 13 and of which a second end 18 connects to the irrigation point, being the hollow needle 14 in the embodiment shown. What is achieved by use of the overflow pipe 15 is that solid particles in the stored moisture 19, such as dirt and/or dust, which rest on the bottom 16 of the reservoir 13 up to the level of the first end 17 of the overflow pipe 15, do not reach the subsoil 7 via the irrigation points. Obstruction of the irrigation points is thereby prevented. The overflow pipe 15 thus functions as a simply arranged filter for settled solid particles in the stored moisture 19.

The regulating means can, for instance, also comprise a permeable film, a capillary string or a membrane which is arranged in the passage of the hollow needle 14.

In addition, the reservoir 13 is provided with an overflow opening 21 in the tube 22 of the reservoir 13, so that excess moisture can flow away easily. The overflow opening 21 is positioned just above the level of the opening 12.

Under the water recovery surface 9, thermal insulation material 20 is arranged, so that a temperature difference between the water recovery surface 9 and the surrounding atmosphere is maintained as long as possible to promote the moisture recovery process. The bottom side of the insulation material 20 may be of horizontal as well as concave or convex design, a concave shape preventing the evaporation of the moisture stored in the reservoir 13.

Further, on the outside, the device 1 is provided with eyes 29. Through the eyes 29, an anchoring pin 30 may be provided for anchoring the device to the subsoil 7. Optionally, on the pin, at different distances, a hook 31 is provided which can engage an eye of the device. Thus, a pin can carry the device at a desired height. Also, the orientation of the device can be set, so that the device can be positioned substantially horizontally above an inclined, sloping subsoil. Preferably, the eyes are evenly distributed over the perimeter of the device, for instance at 90° intervals. The pin is further optionally provided with arms extending substantially sideways, so that the pin can be stabilized sideways against the surface 6 of the subsoil 7.

The water recovery surface 9 forms a collection structure 8 for recovering moisture present in the atmosphere. During operation of the device 1, the water recovery surface 9 makes an angle with respect to the orientation of gravity. According to an aspect of the invention, the collection structure 8 is modularly coupled to the reservoir 13. Further, the collection structure 8 is nestable.

Since the collection structure can sidewards extend farther than the tube of the device, the effective surface for receiving the moisture is enlarged. As a result, more water becomes available for the young plant than the precipitation that could be collected by the inner space of the tube alone.

By recovering water from the atmosphere through condensation, it is possible to plant in relatively dry and/or rocky areas as well. Soils containing salt or brackish water are also eligible for planting, since due to the increased amount of available moisture, segments with fresh water can be formed in the subsoil. In addition, plants and trees can be planted in an earlier stage, since the organism is better sheltered and taken care of by the device according to the invention than in the case of the known device. Of course, this brings with it the advantage that fewer costs are involved for obtaining the younger plants. In addition, transport costs are lower. As a result of the constant water supply, the young plant can be planted on the soil instead of in a planting hole to be dug. Thus, the capillary of the soil is not disturbed and planting can also be done on rocky soils.

It is further noted that the tube surrounds the young plant sideways at least partly. Of course, it is also possible for the tube to be closed all round, so that the tube surrounds the plant completely. However, it is also possible to leave an opening or gap clear, for instance for providing germination material in the tube, after the plant aid has been positioned on the subsoil. Preferably, the young plant is provided such that the tube at least partly surrounds the root structure or root structure to be formed. The stalk, stem, branches and/or leaves are then substantially above the upper edge of the tube, so that sufficient air flowing along is available for the plant. Of course, it is also possible to position the young plant differently, for instance with the leaves at least partly below the upper edge of the tube, so that a better mechanical protection of the young plant is obtained.

The device according to the invention thus functions not only to protect the plant from physical influences from outside, but also to support the plant and to stimulate growth of the young plant.

By making the water recovery surface of substantially funnel-shaped design, the recovered moisture can easily be guided to the inside of the tube, so that the moisture benefits the plant. In addition, relatively much daylight and/or sunlight and/or ventilation is available to the young plant, so that fungal growth is prevented and assimilation and/or ventilation processes are minimally influenced. However, the water recovery surface may be designed differently, for instance as a cone frustum which has the largest diameter at the bottom side. The recovered moisture can then be collected at the edges.

Figure 2:
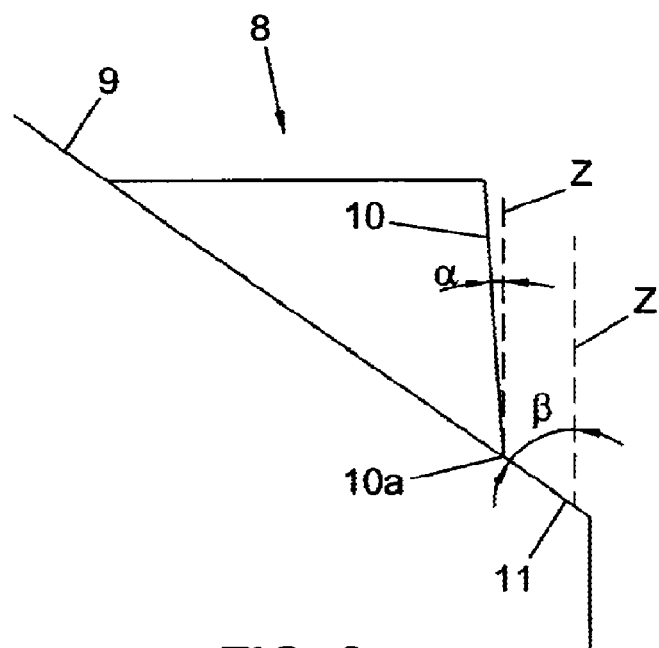
FIG. 2 shows a schematic view of a cross section of a first embodiment of the water recovery surface of the device of FIG. 1.
Figure 3:
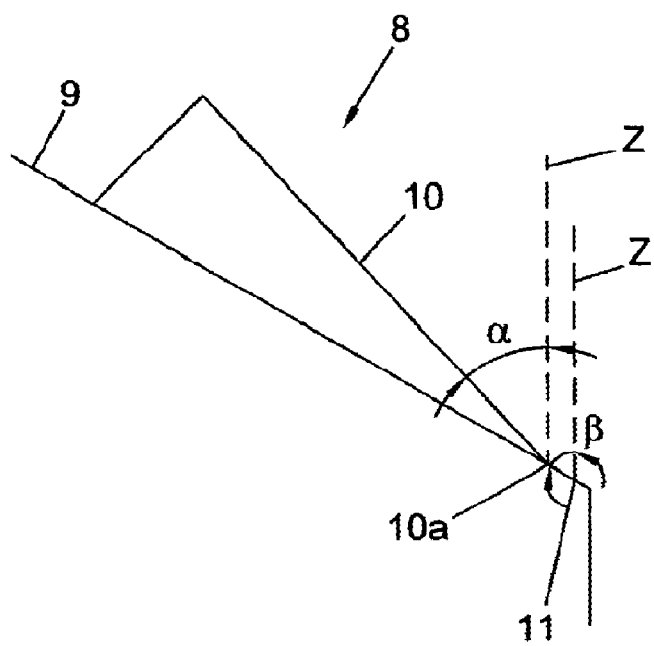
FIG. 3 shows a schematic view of a cross section of a second embodiment of the water recovery surface of the device of FIG. 1.

FIGS. 2 and 3 show a schematic side elevational view of a first and a second embodiment, respectively, of the collection structure 8 of the device 1 which functions as plant aid. The collection structure 8 has a water recovery surface 9 which is oriented substantially upwards for recovering moisture present in the atmosphere. Through a specific structure, the water recovery surface 9 comprises at least one receiving surface 10 and at least one collecting surface 11 for obtaining and collecting the moisture, respectively. The receiving surface 10 makes a first angle $\alpha$ with respect to the orientation of gravity Z. The collecting surface 11 makes a second angle $\beta$ with respect to the orientation of gravity Z. The first angle $\alpha$ is smaller than the second angle $\beta$, so that, in principle, drops on the receiving surface 10 slide down faster than drops on the collecting surface 11. Since the collecting surface 11 adjoins a lower edge 10a, relatively many drops will gather near the collecting surface 11 and form larger drops due to cohesive forces. Larger drops experience relatively fewer adhesive forces from the water recovery surface 9, so that a second angle $\beta$ which is larger than the first angle $\alpha$ is sufficiently steep to make the drops slide down along the collecting surface 11 into the tube 2 or into an opening 12 to the reservoir 13.

By making the surface of the water recovery surface 9 particularly water-repellent, as described above, it is also possible to obtain an effective device for recovering moisture present in the atmosphere where the water recovery surface 9 only comprises surfaces that are oriented at one predetermined angle with respect to the gravity direction.

It is noted that a water recovery surface with surfaces that are only oriented at one predetermined angle with respect to the direction of gravity can be used not only with the device according to claim 1 but also more generally in combination with a device for recovering moisture present in the atmosphere, comprising a collection structure with a water recovery surface, which during use makes at least partly an angle with respect to the orientation of gravity, while the water recovery surface is of water-repellent design.

Water drops on the receiving surface 10 are obtained by receiving precipitation and/or water drops which are obtained from the atmosphere by the water recovery process, as by dew and/or condensation, with the receiving surface 10 functioning as a condensing surface. Solid precipitation is received and collected in the same manner as wet precipitation.

Optionally, the device 1 can be reused. However, it is also possible to manufacture the device 1 from (biologically) degradable material, such as biopolymers, so that dismantling work is limited or is unnecessary altogether. In the latter situation, the device 1 can advantageously be provided with at least one graft shell 5. Further, the device can subsequently serve as compost and/or comprise growth-promoting means.

Preferably, the device is of opaque, nontransparent design, so that formation of weeds inside the device is prevented.

Figure 4:
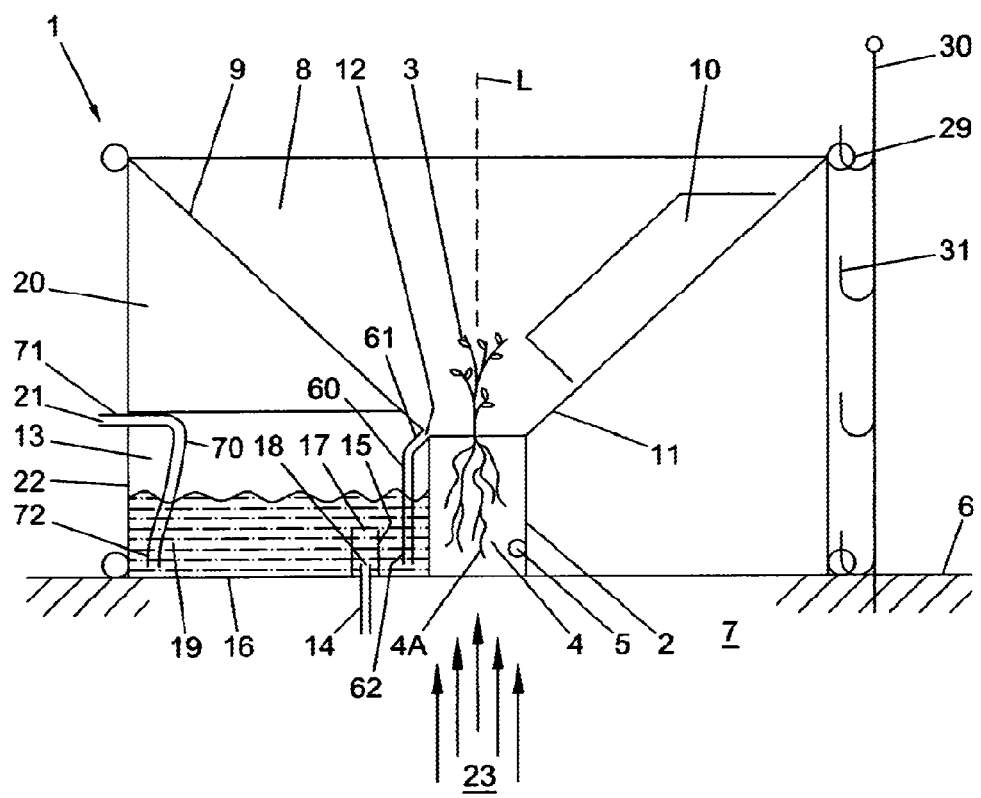
FIG. 4 shows a schematic view of a cross section of a second embodiment of a device according to the invention.

FIG. 4 shows a schematic view of a cross section of a second embodiment of a device 1 according to the invention.

The second embodiment is designed substantially identically to the first embodiment as described with reference to FIGS. 1-3. In FIG. 4, the reservoir 13 comprises an inlet pipe 60 which, by a first end 61, inwardly connects to the edge of opening 12 in the water recovery surface 9. By use of such an inlet pipe 60, loss of moisture present in the reservoir 13 through evaporation is reduced considerably. This is because the amount of moisture that can evaporate generally increases when the size of the liquid surface that is in gas communication with the opening 12 increases. Conversely, the amount of liquid lost by evaporation decreases accordingly as the size of the liquid surface that is in gas communication with the opening 12 decreases. Since the liquid surface in the inlet pipe 60 is much smaller than the rest of the liquid surface in the reservoir 13, evaporation through the opening 12 is correspondingly much less, and hence the loss of moisture through evaporation from the reservoir 13 is also much less. Thus, the liquid in the inlet pipe 60 forms a barrier to moisture evaporating from the rest of the liquid surface in the reservoir 13.

As the inlet pipe 60 extends by a second end 62 to a point just above the bottom 16 of the reservoir 13, the inlet pipe 60 also functions if only a small amount of moisture is present in the reservoir, because the second end 62 of the pipe 60 is still below the liquid surface then.

Preferably, the inlet pipe 60 tapers in the direction of the first end 61, so that obstructions at the bottom of the inlet pipe are advantageously prevented.

Further, the reservoir 13 comprises an overflow pipe 70, similarly connecting to the edge of the outflow opening 21 by a first end 71 and extending to a point just above the bottom 16 of the reservoir 13 by a second end 72, so that evaporation of moisture through the outflow opening 21 is prevented. In order to prevent obstructions in the overflow pipe 70, the pipe can be constructed such that the pipe tapers in the direction of the first end 71, as is the case with the inlet pipe 60.

Also in the second embodiment of the device according to the invention, as shown in FIG. 4, the collection structure 8 is modularly coupled to the reservoir 13 and the collection structure 8 is of nestable design.

Figure 5:
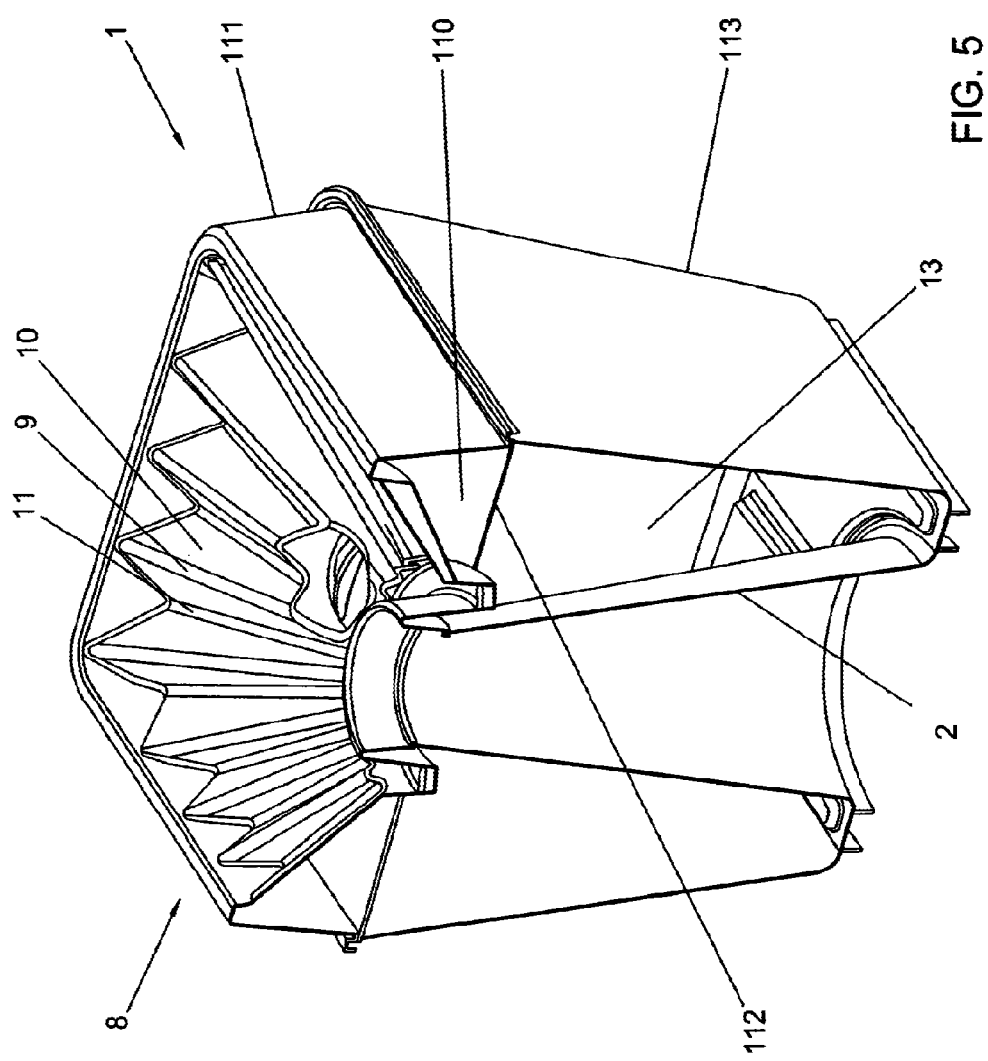
FIG. 5 shows a schematic perspective view of a third embodiment of a device according to the invention in partly cutaway condition.

FIG. 5 shows a schematic perspective view of a third embodiment of a device according to the invention in partly cutaway condition.

The device 1 comprises a collection structure 8 with a water recovery surface 9 which, during use, at least partly makes an angle with respect to the orientation of gravity. Furthermore, the collection structure 8 is modularly coupliable to the reservoir 13. The water recovery surface 9, as in the first and second embodiments, is designed with a receiving surface 10 and a collecting surface 11.

Furthermore, the device 1 comprises a tube 2 which can at least partly surround a young plant. The tube 2 and the reservoir 13 are integrally formed, thus yielding a saving on the number of necessary components for assembling the device 1. The integrated tube and reservoir are couplable as a module to the collection structure. Preferably, the tube and the reservoir on the one hand and the collection structure on the other hand are coupled to each other moisture-tightly and/or airtightly, so that no moisture is lost. In addition, the modules are preferably detachable, so that the device can be easily dismantled. Furthermore, the coupling between the modules is preferably such that a minimal heat exchange occurs. In this way, the water recovery surface can be kept cool.

The collection structure 8, the tube 2 and/or the reservoir 13 can, for instance, be made of plastic. Advantageously, use can then be made of an injection molding process or comparable manufacturing processes.

Figure 6:
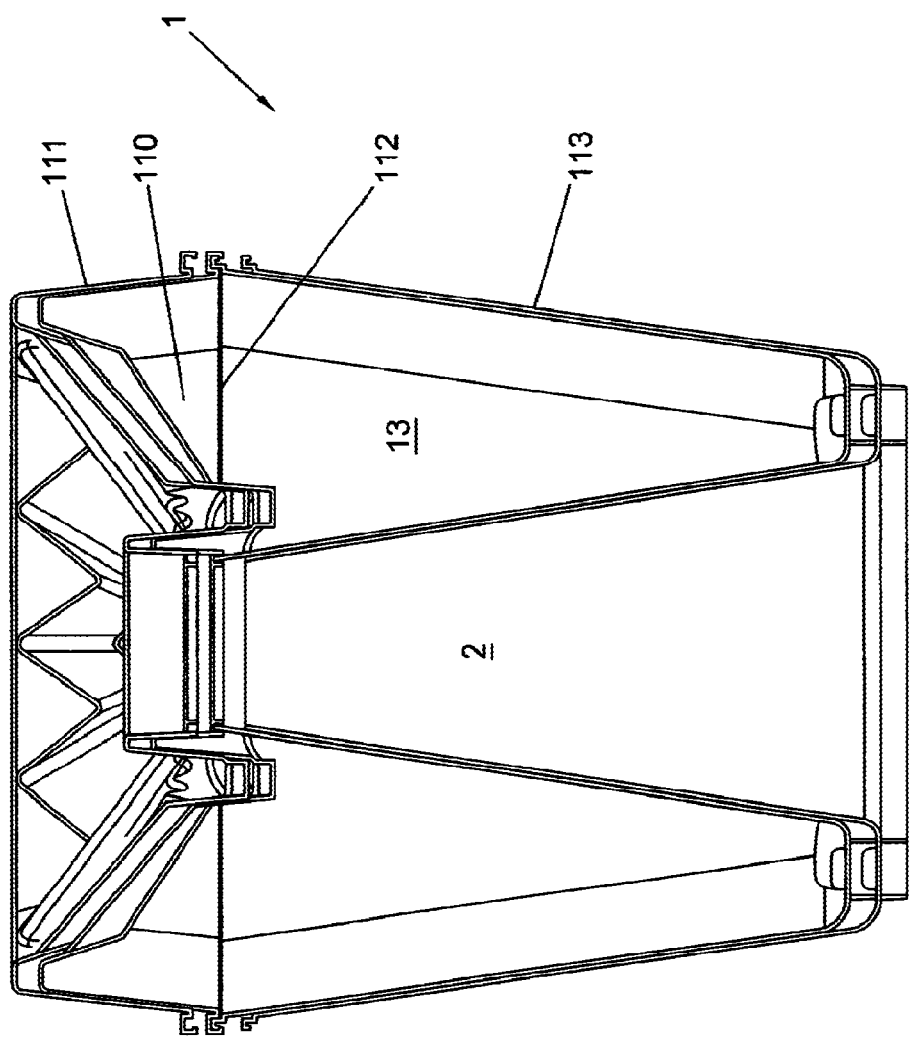
FIG. 6 shows a schematic view of a cross section of two nested devices of FIG. 5.

Most preferably, the integrated tube and reservoir are also made of nestable design, so that the modules can be compactly stored, transported and distributed, for instance in units of a few tens or hundreds. Also when the tube and the reservoir are of separate design, the tube and/or the reservoir may have been given a nestable form. FIG. 6 shows a schematic view of a cross section of two nested devices of FIG. 5. Here, two reservoirs, each integrated with a tube, are nested, and also two collection structures are nested.

Advantageously, the angle which a wall segment of the tube, the reservoir and/or the collection structure operatively makes with respect to the direction of gravity can be minimized depending on the wall thickness. Thus, the angle referred to can be chosen to be smaller accordingly as the wall thickness decreases. In this way, a compact storage possibility has been created for the modules of the device, while a largest possible volume is also available for the reservoir. In a practical embodiment, the wall 113 of the reservoir has for instance an angle of about 6° to 10° with respect to the direction of gravity.

In the embodiment shown, the tube has a tapering configuration, such that the tube has a largest diameter at the lowest point, on the side opposite the collection structure. As a result, the device can be simply removed with a low chance of the plant or parts of the root block thereby being pulled along in an upward direction. Thus, in principle, the device has the property of clear withdrawal.

Optionally, the tube, the reservoir and/or the collection structure is of two-part or multi-part design, so that individual parts can be removed by uncoupling. In this way, the device can be dismantled comparatively simply without damaging the plant, also in the longer term when branches and leaves have been formed which extend laterally and/or upwardly. The individual parts can be mutually connected for instance with a snap system. Of course, other attachment techniques are applicable, for instance, a suspension system. Furthermore, the device may not be fully closed, in top plan view, but, for instance, form substantially a U-shape, so that the whole can later be easily pulled away sideways.

Preferably, the dimensions of the device and/or the modules thereof are chosen such that the space on a pallet can be utilized optimally. Thus, a length-width ratio can be chosen to be, for instance, circa 40 cm×circa 60 cm, circa 50 cm×circa 60 cm, circa 80 cm×circa 60 cm, and circa 100 cm×circa 60 cm.

It is noted that the device may alternatively be manufactured from relatively heavy material, for instance from cement and/or metal. In this way, the device can at the same time serve as a protection from mechanical external influences, so that injury of the plant can be prevented.

The sidewall of the reservoir 13 can be at least partly transparent, so that harmful bacteria can be rendered harmless under the influence of UV radiation. Moreover, the liquid level can then be readily determined visually. Alternatively or additionally, means may be added to the collected moisture to control, for instance, bacteria, such as legionella bacteria.

Furthermore, the tube 2, the reservoir 13 and/or the collection structure 8 may be provided with stiffening ribs, so that a predetermined stiffness can be realized with a relatively small wall thickness. Advantageously, the reservoir 13 may be formed asymmetrically in top plan view. What is thus achieved is that, on the one hand, the reservoir 13 is nestable and, on the other, when stacked in alternation, the underside of a reservoir is borne by an upper edge of the reservoir positioned under it. By thus making the reservoir stackable and nestable at the same time, the reservoir can also fulfill another function, for instance as storage box.

Situated under the water recovery surface 9 is an insulation chamber 110 for insulating the surface mentioned. As a result, the water recovery surface remains cool longer when subjacent structures warm. The insulation chamber is bounded at the top by the water recovery surface. Furthermore, the insulation chamber 110 is laterally bounded by a downwardly oriented flange 111 of the collection structure 8. The bottom of the insulation chamber 110 is formed by a plate-shaped element 112 which is arranged modularly above the reservoir. By the use of the plate-shaped element 112, an insulation chamber can be formed in a simple manner.

If desired, insulation material may be arranged in the insulation chamber 110. However, it is also possible that air present in the chamber 110 serves as insulation.

It is noted that parts of the water recovery surface are oriented at a relatively large angle with respect to the direction of gravity, so that the radiating effect of the surface is utilized as much as possible.

Furthermore, the reservoir is provided with a replenishment opening 114 for optionally replenishing the reservoir by hand or mechanically. As a result, a young plant can be provided with more liquid than is available on the basis of the moisture recovered from the atmosphere. Also, in this way, other ingredients can be added, for instance nutrient supplements. Advantageously, the replenishment opening is accessible via the collection structure. By providing the replenishment opening relatively high, a maximum space for the reservoir can be utilized.

Figure 7:
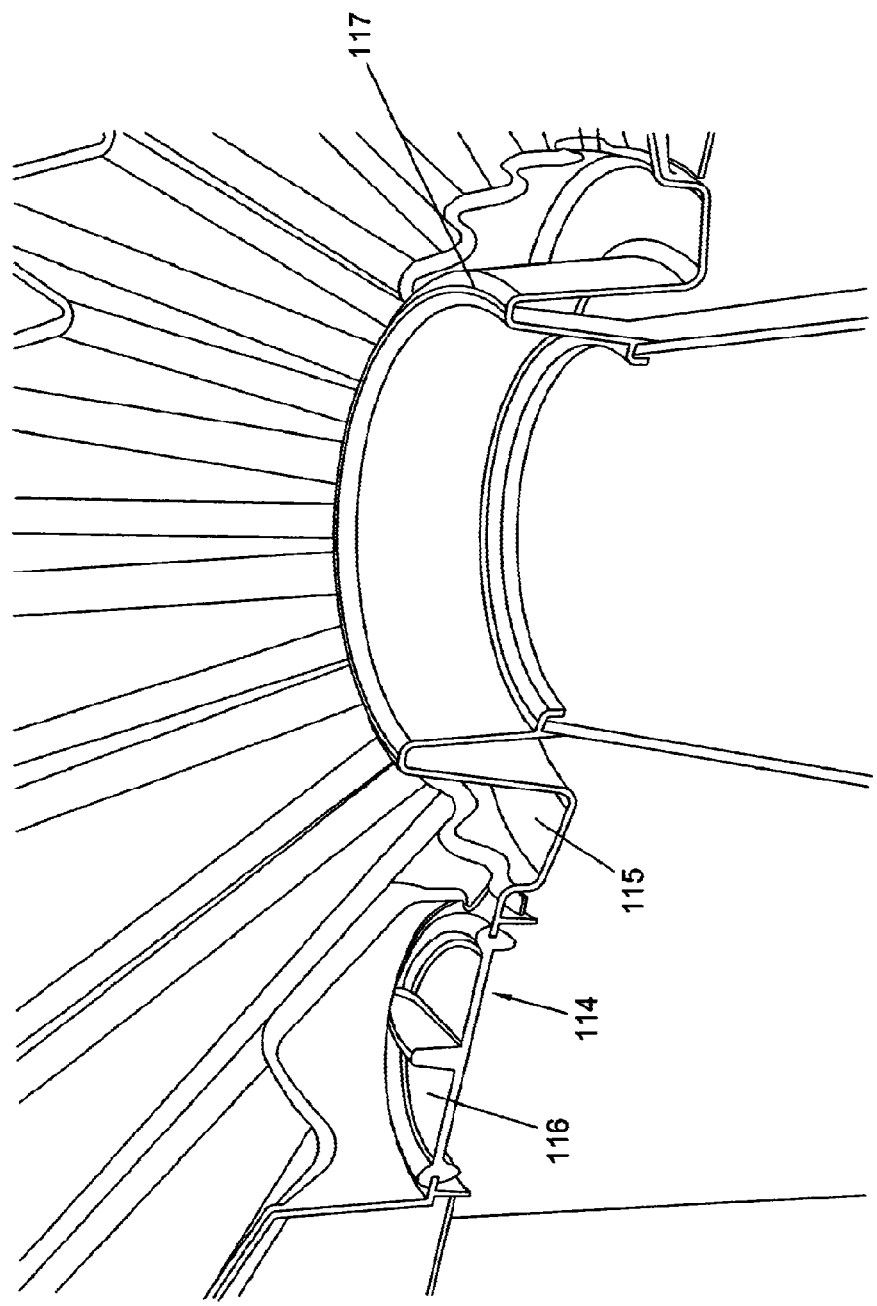
FIG. 7 shows a schematic perspective partial view of the water recovery surface of the device of FIG. 5.

FIG. 7 shows a schematic perspective partial view of the water recovery surface 9 of the device as shown in FIGS. 5 and 6. The replenishment opening 114 is located near the lowest point of the water recovery surface 9, so that a maximum space is also available for the insulation chamber. In the embodiment shown, the lowest point is situated approximately in the middle of the water recovery surface, near the tube 2. Situated around the tube is a gutter 115 in which the collected moisture ends up to be guided via the inlet pipe 60 to the reservoir 13. Provided on the radial inside of gutter 115 is an upstanding edge 117, so that an extra water storage, on the water recovery surface, is realized.

By the use of the upstanding edge 117 near lower parts of the water recovery surface, the water recovery surface can serve as a temporary water reservoir, for instance during and directly after a heavy shower of rain. In case of heavy rainfall, the amount of recovered rainwater per unit time may be greater than the discharge capacity of the water recovery surface towards the reservoir. The rainwater collected in the temporary water reservoir may then be discharged afterwards via opening 12, optionally provided with an inlet pipe 60, to the reservoir proper. In the absence of the upstanding edge 117, an excess of rainwater would flow directly into the tube and thus be lost for delivery to the plant via the reservoir at a later stage.

It is noted that configuring the water recovery surface in such a manner that it can also serve, at least partly, as a temporary reservoir for moisture collected by the device, can be used not only with the device according to claim 1, but also, more generally, in combination with a device for recovering moisture present in the atmosphere, comprising a collection structure having a water recovery surface which during use at least partly makes an angle with respect to the orientation of gravity.

Advantageously, the replenishment opening 114 is closable by a replenishment cap 116 which is preferably of airtight design. To this end, the replenishment cap may for instance be closed off on diameter and comprise a bayonet catch. Of course, numerous alternatives are conceivable, for instance utilizing closing rings. However, by closing off the replenishment cap on diameter, a substantially airtight closure can be obtained in an elegant manner with a single element.

In the design shown, the replenishment opening 114 has been realized by designing the plate-shaped element 112 with an opening. Since the opening 114 is realized near the lowest point of the water recovery surface 9, the reservoir is directly accessible from the water recovery surface 9 and no extra provisions such as an extra tube or the like are needed.

It is noted that a reservoir provided with a replenishment opening can be used not only with the device according to claim 1, but also more generally in combination with a device for recovering moisture present in the atmosphere, comprising a collection structure having a water recovery surface which during use makes at least partly an angle with respect to the orientation of gravity.

Figure 10:
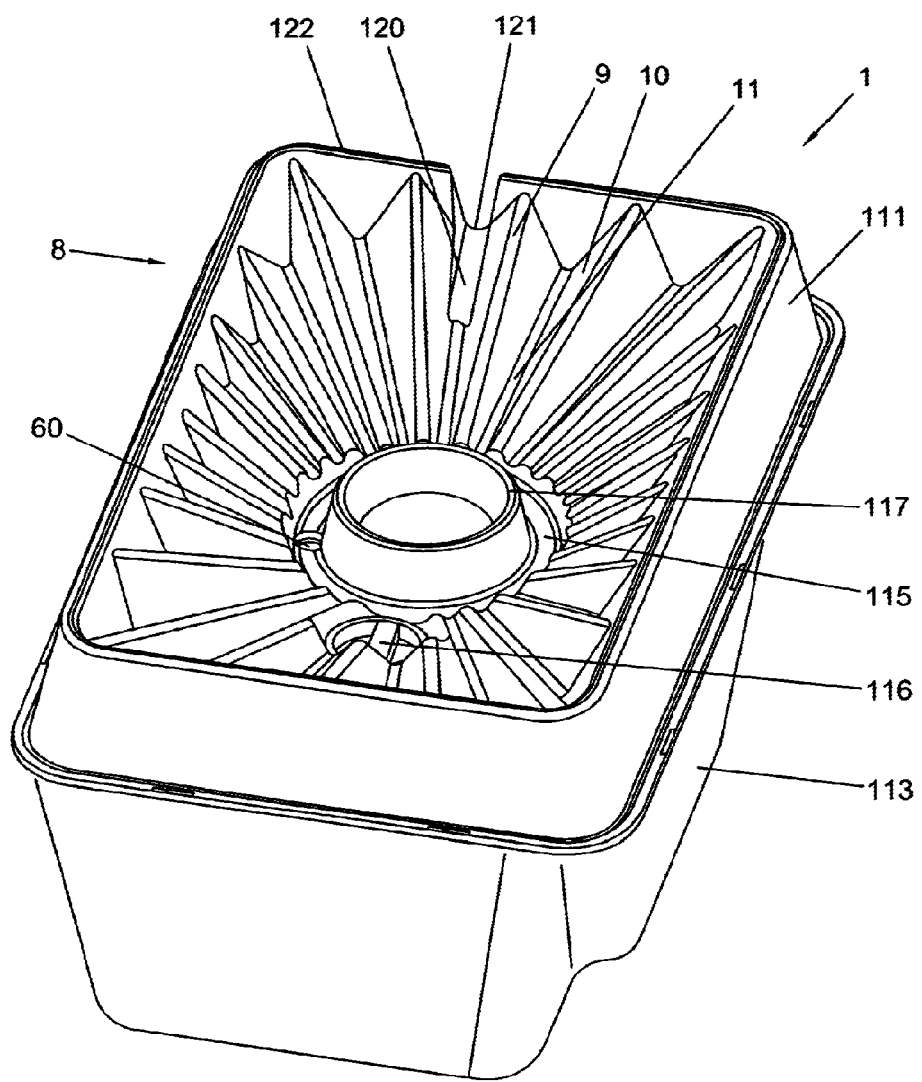
FIG. 10 shows a first schematic perspective view of a sixth embodiment of a device according to the invention.
Figure 11:
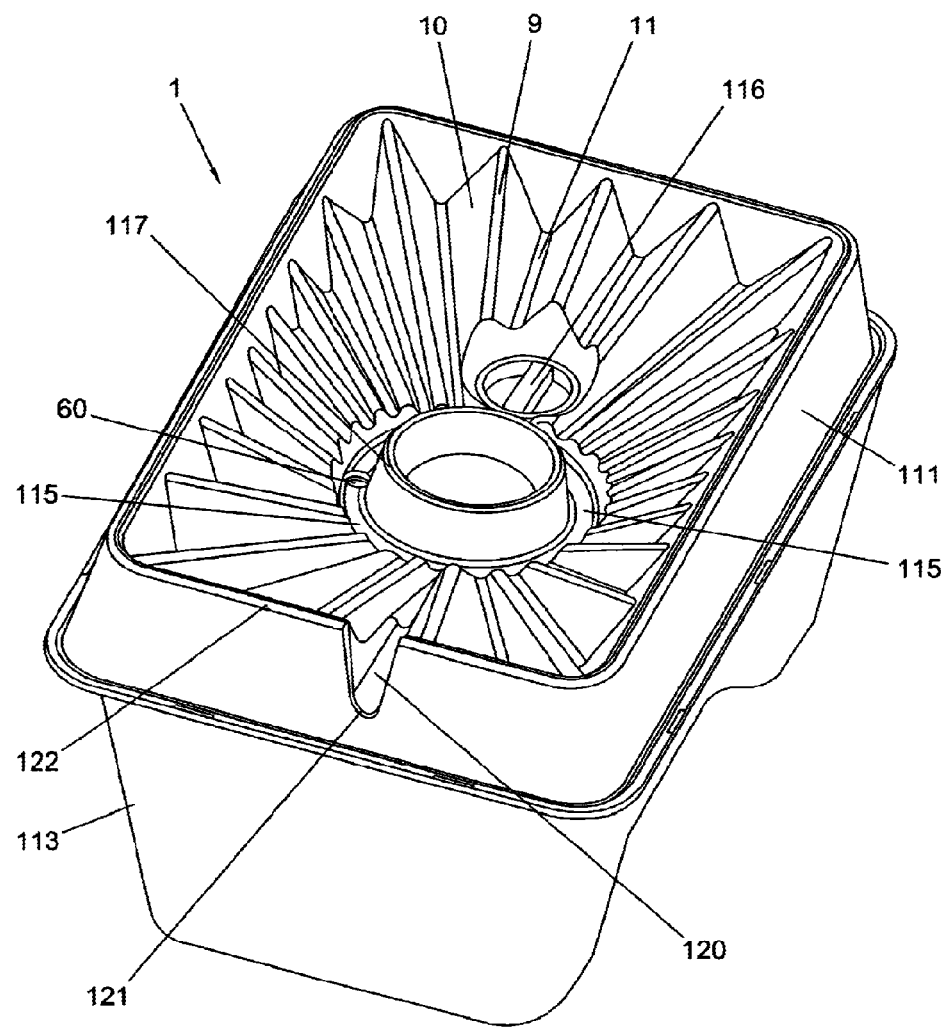
FIG. 11 shows a second schematic perspective view of the device of FIG. 10.

FIGS. 10 and 11 show a first and second schematic perspective view of a sixth embodiment of a device according to the invention. The device broadly corresponds to the third embodiment of a device according to the invention as shown in FIGS. 5-7. Thus the device is provided with a collection structure 8 with a water recovery surface 9. The collection structure 8 is coupled to the reservoir with reservoir wall 113. Furthermore, the water recovery surface 9 comprises an overflow structure to discharge an excess of collected moisture outwardly. The overflow structure has an overflow pathway of which the highest path, viewed in the direction of gravity, is lower than the top of the upstanding tube edge 117. Thus the overflow pathway forms a path for an excess of moisture from lower parts of the water recovery surface 9 to outside the side edge 122 of the device. As a result, an excess of collected moisture, for instance during heavy rainfall, which threatens to flow into the tube, can be discharged outwardly.

When in a short time much moisture is being recovered, the moisture flows via the gutter 115 and the inlet pipe 60 into the reservoir. When the inlet pipe 60 cannot process the collected moisture anymore, a temporary storage space is created on the lowermost part of the water recovery surface 9, with the upstanding edge 117 around the tube preventing the moisture flowing into the tube, as described above. If the moisture level in the temporary storage space rises still further, so far that the moisture threatens to flow over the upstanding edge 117 into the tube, then the excess moisture drains outwardly via the overflow structure, thus preventing an excess of moisture flowing into the tube still. The moisture flows outwardly out of the device via one or a plurality of overflow pathways of the overflow structure.

The overflow structure shown in FIGS. 10 and 11 is implemented as a channel 120, of which the highest path 121 is near the outer edge 122 of the water recovery surface 9. In the embodiment shown, the channel 120 runs through the outer edge 122. Of course, it is also possible to construct the overflow structure differently, for instance as a plurality of channels, so that upon sudden overflow a stabler situation is created. When the channels are arranged at different, preferably opposite segments of outer edges 122, the excess moisture can also flow away outwards when the device is not placed wholly vertically.

The channel 120 is situated in a lower part of the water recovery surface 9, in a collecting surface in the embodiment shown. In this way, relatively little or no surface area of receiving surfaces, and hence receiving capacity of the device, is lost.

Optionally, in an advantageous, simpler manner, the reservoir is designed without an overflow pipe 70, since in view of the overflow structure on the water recovery surface, a structure for removing excess moisture is provided already.

It is noted that a water recovery surface which comprises an overflow structure to discharge an excess of collected moisture outwardly can be used not only with the device according to claim 1, but also more generally in combination with a device for recovering moisture present in the atmosphere, comprising a collection structure having a water recovery surface which during use at least partly makes an angle with respect to the orientation of gravity.

The invention is not limited to the exemplary embodiment described herein. Many variants are possible.

Thus, the water recovery surface may be designed in different colors. By providing the surface with a light color, heat absorption by way of sunlight is relatively small, so that a condensation process for recovering water remains effective for a relatively long time.

Further, the collection structure can be used not only in combination with a plant aid, but also independently for recovering moisture present in the atmosphere, for instance with the aid of fixing means for fixation on buildings, craft, such as sailing ships, or on other floating constructions offshore. The recovered moisture may be processed for obtaining drinking water or otherwise, for instance for chemical processes and/or irrigation purposes.

Figure 8:
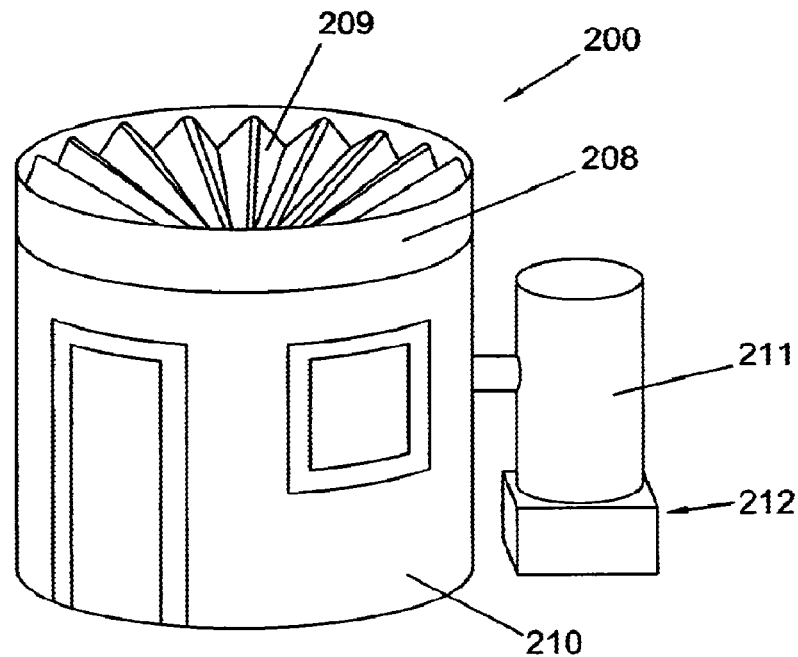
FIG. 8 shows a schematic perspective view of a fourth embodiment of a device according to the invention.

FIG. 8 shows a schematic perspective view of a fourth embodiment of a device 200 according to the invention. The collection structure 208 with the water recovery surface 209 is mounted as a roof on a house 210, so that precipitation and other moisture recovered from the atmosphere can be collected. The reservoir is designed as a vat 211 which is connected to the water recovery surface 209. Furthermore, the vat 211 is provided with a draw-off tap 212 for tapping the collected moisture. It is noted that such a device may also be applied to other types of commercial and industrial buildings, such as offices or industrial premises. Owing to the rib structure of the collection structure 208 a particularly stiff whole has been obtained which is thus relatively well resistant to shocks, such as earth shocks or earthquakes.

Figure 9:
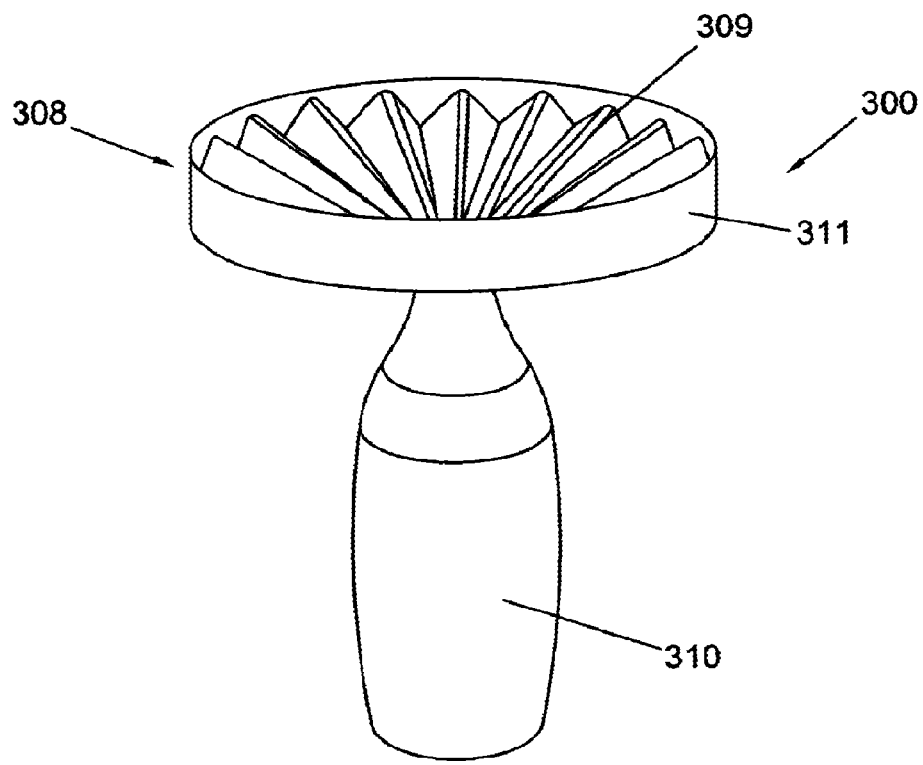
FIG. 9 shows a schematic perspective view of a fifth embodiment of a device according to the invention.

FIG. 9 shows a schematic perspective view of a fifth embodiment of a device 300 according to the invention. Here, the collection structure 308 with the water recovery surface 309 is mounted to the top of a bottle 310 which serves as reservoir. Consequently, in an elegant and easy manner, moisture can be recovered and stored in a bottle, for instance a bottle for soft drink. Advantageously, the underside of the collection structure 308 can be provided with a screw thread which corresponds to the screw thread of the bottle, such that the collection structure can be screwed like a cap onto the bottle. In this way, a simple, robust and watertight connection with the bottle is obtained. Using a screw connection with corresponding dimensioning, the collection structure 308 is here coupled modularly to the reservoir, which is designed as a bottle 310. Of course, other coupling techniques of the collection structure and the bottle are also possible, for instance a snap connection. The bottle with collection structure can be placed on or in the ground. In the case of placement in the ground, the downwardly oriented flange 311 of the water recovery surface 309, with the bottle buried in the ground, forms a side edge of an insulation chamber as described above. However, in principle, the water recovery surface 309 can also be designed without downwardly oriented flange 311, for instance to simplify the fabrication process of the collection structure 308.

Use of a device according to the invention is further possible by positioning it above salt or brackish water, since condensation of evaporated salt or brackish water results in fresh water production.

Optionally, above the water recovery surface, a mesh structure is provided, thus preventing damage to the plant by animals in the environment of the device.

Such variants will be clear to the skilled person and are understood to be within the scope of the invention as set forth in the following claims.

The invention claimed is:

1. A device for recovering moisture present in the atmosphere, comprising a collection structure for collecting moisture present in the atmosphere, wherein the collection structure is provided with a water recovery surface which during use at least partly makes an angle with respect to the orientation of gravity, wherein the collection structure is provided with an upstanding edge bounding lower parts of the water recovery surface, the device further comprising a tube for at least partly sideways surrounding a young plant placeable in the collection structure, wherein the upstanding edge forms the upper edge of the tube.

2. The device according to claim 1 wherein the collection structure is detachably couplable to a reservoir for storing the recovered moisture, wherein the collection structure is nestable.

3. The device according to claim 1, wherein the tube is couplable onto the collection structure.

4. A device for recovering moisture present in the atmosphere, comprising a collection structure for collecting moisture present in the atmosphere, wherein the collection structure is provided with a water recovery surface which during use at least partly makes an angle with respect to the orientation of gravity,
and a reservoir for storing recovered moisture is provided with a replenishment opening in operative association with the collection structure.

5. The device according to claim 4, wherein the replenishment opening is accessible via the collection structure.

6. The device according to claim 4, wherein the replenishment opening is located at least one of near a tube for at least partly sideways surrounding a young plant placeable in the collection structure and near the lowest point of the water recovery surface.

7. The device according to claim 4, wherein the replenishment opening is formed by a recess of the plate-shaped structure arranged modularly above the reservoir, which recess aligns with a recess in the collection structure.

8. The device according to claim 4 wherein the collection structure is detachably couplable to the reservoir for storing the recovered moisture, wherein the collection structure is nestable.

9. A device for recovering moisture present in the atmosphere, comprising a collection structure for collecting moisture present in the atmosphere, wherein the collection structure is provided with a water recovery surface which during use at least partly makes an angle with respect to the orientation of gravity, and
wherein the water recovery surface comprises an overflow structure on the water recovery surface to discharge an excess of collected moisture from the water recovery surface outwardly.

10. The device according to claim 9, further comprising the collection structure being provided with an upstanding edge bounding lower parts of the water recovery surface and wherein the overflow structure has an overflow pathway of which the highest path, viewed in the direction of gravity, is lower than a top of the upstanding edge.

11. The device according to claim 9, wherein the overflow pathway forms a path from lower parts of the water recovery surface to outside a side edge of the device.

12. The device according to claim 9 wherein the collection structure is detachably couplable to a reservoir for storing the recovered moisture, wherein the collection structure is nestable.

* * * * *